(12) United States Patent
Penn

(10) Patent No.: US 7,324,279 B2
(45) Date of Patent: Jan. 29, 2008

(54) DUAL MODULATOR PROJECTION SYSTEM

(75) Inventor: Steven M. Penn, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 432 days.

(21) Appl. No.: 10/032,906

(22) Filed: Dec. 28, 2001

(65) Prior Publication Data

US 2002/0135856 A1    Sep. 26, 2002

Related U.S. Application Data

(60) Provisional application No. 60/258,614, filed on Dec. 28, 2000.

(51) Int. Cl.
  *G02B 27/26* (2006.01)
(52) U.S. Cl. .............. 359/465; 353/8; 349/15; 348/54; 348/58
(58) Field of Classification Search ........ 359/465, 359/464, 630, 639, 640, 63; 353/9, 8; 349/15; 348/58, 54, 51; 362/551, 552
See application file for complete search history.

(56) References Cited

U.S. PATENT DOCUMENTS

| | | | | |
|---|---|---|---|---|
| 4,969,730 A | * | 11/1990 | van den Brandt | 353/31 |
| 5,121,983 A | * | 6/1992 | Lee | 353/8 |
| 5,490,009 A | * | 2/1996 | Venkateswar et al. | 359/291 |
| 5,552,840 A | * | 9/1996 | Ishii et al. | 348/751 |

(Continued)

OTHER PUBLICATIONS

U.S. Appl. No. 60/189,482.*

(Continued)

*Primary Examiner*—Stephone B. Allen
*Assistant Examiner*—Lee Fineman
(74) *Attorney, Agent, or Firm*—Charles A. Brill; Wade James Brady, III; Frederick J. Telecky, Jr.

(57) ABSTRACT

A three dimensional display system 100 using two spatial light modulators and a single projection path. Light source 102 emits a white light beam 104 which typically is focused onto an aperture of a recycling integrator 106. The light beam travels through the recycling integrator 106 and is reflected several times by the walls of the integrator 106. The sequential color filter creates a filtered light beam comprised of at least three spatially separated light beams. The filtered light beam, containing the colored filtered sub-beams, is separated by a polarizing beam splitter 116 into two separate light beams, each comprising a portion of each color sub-beam created by the sequential color filter. A first portion of the light beam having a first polarization state is passed to a first spatial light modulator 112. A second portion of the light beam having a second polarization state is reflected to a second spatial light modulator 114. The two modulators 112, 114 receive pixel data from a controller 118 and use the pixel data to modulate the light incident each of the modulators. A projection lens 118 receives the modulated light beam and focuses the modulated light beam on an image plane 120. A viewer uses polarizing eyewear 122 to view the projected image. The polarizing eyewear 122 allows light of one polarization to pass through to the viewer's left eye, and light of the other polarization to pass through to the viewer's right eye creating the perception of a three dimensional image.

28 Claims, 2 Drawing Sheets

U.S. PATENT DOCUMENTS

| | | | |
|---|---|---|---|
| 5,583,688 A | | 12/1996 | Hornbeck |
| 5,612,753 A | * | 3/1997 | Poradish et al. ............. 348/743 |
| 5,863,125 A | * | 1/1999 | Doany ........................ 353/84 |
| 5,896,232 A | * | 4/1999 | Budd et al. ................. 359/630 |
| 6,097,456 A | * | 8/2000 | Wang ......................... 349/105 |
| 6,285,415 B1 | * | 9/2001 | Brennesholtz ............. 348/742 |
| 6,533,427 B2 | * | 3/2003 | Chang ......................... 362/19 |
| 6,771,325 B1 | * | 8/2004 | Dewald et al. ............. 348/743 |
| 6,962,414 B2 | * | 11/2005 | Roth ........................... 353/20 |
| 2001/0008470 A1 | * | 7/2001 | Dewald ....................... 359/850 |
| 2003/0020809 A1 | * | 1/2003 | Gibbon et al. ................ 348/51 |
| 2003/0086066 A1 | * | 5/2003 | Kato ........................... 353/20 |
| 2003/0112507 A1 | * | 6/2003 | Divelbiss et al. ........... 359/464 |
| 2004/0156212 A1 | * | 8/2004 | Kamijima ................... 362/551 |

OTHER PUBLICATIONS

U.S. Appl. No. 09/705,467, filed Nov. 3, 2000, Dewald et al.

U.S. Appl. 10/054,063, filed Nov. 13, 2001, Melton.

* cited by examiner

DUAL MODULATOR PROJECTION SYSTEM

CROSS-REFERENCE TO RELATED APPLICATIONS

This application claims priority under 35 USC § 119(e)(1) of provisional application No. 60/258,614 filed Dec. 28, 2000.

The following patents and/or commonly assigned patent applications are hereby incorporated herein by reference:

| U.S. Pat. No. | Filing Date | Issue Date | Title |
| --- | --- | --- | --- |
| 5,583,688 | Dec. 21, 1993 | Dec. 10, 1996 | Multi-Level Digital Micromirror Device |
| 09/705,467 | Nov. 3, 2000 | | Sequential Color Recapture for Projection Systems |
| TI-28388 | Nov. 30, 2000 | | Automated Convergence and Focus Verification of Projected Images |

FIELD OF THE INVENTION

This invention relates to the field of display systems, more particularly to three dimensional display systems.

BACKGROUND OF THE INVENTION

Display systems create an image from electrical signals that represent the desired image. Many different criteria and performance metrics are used to evaluate the image quality, including brightness, contrast, resolution, color purity, and image uniformity. Modem display systems excel at all of these criteria and are capable of creating very high quality images.

One feature that is difficult for a display system to achieve is the perception of a three-dimensional image. Many methods have been devised to create a three-dimensional perception, including moving or rotating projection screens, shuttering the viewers eyes, and use of polarization. Unfortunately, these methods are not very practical to implement. Some of the methods are too inefficient, others require too much alignment of multiple modulators in order to increase the brightness of the image to suitable levels.

What is needed is a system design that will allow projection of a three-dimensional image using a minimum number of modulators while utilizing as much of the source light available.

SUMMARY OF THE INVENTION

Objects and advantages will be obvious, and will in part appear hereinafter and will be accomplished by the present invention which provides a method and system for three dimensional image projection. One embodiment of the claimed invention provides a three dimensional image display system. The display system comprises: a light source, a sequential color filter, a polarizing beam splitter, a first and second spatial light modulator, and at least one projection lens. The light source provides a beam of light along an illumination path. The sequential color filter is on the illumination path and filters the light beam. The polarizing beam splitter is on the illumination path and separates the filtered light beam into a first beam having a first polarization state and a second beam having a second polarization state. The first spatial light modulator receives and selectively modulates the first beam. The second spatial light modulator receives and selectively modulates the second beam. The projection lens on a projection path focuses the first and second beams on an image plane.

One embodiment uses the polarizing beam splitter to recombine the modulated first and second light beams. Another alternate embodiment uses at least one prism in the illumination and projection paths to separating the filtered illumination light beam and the modulated light beam.

Another embodiment uses a first prism in the illumination and projection paths for separating the first beam directed to the first modulator and the modulated first beam from the first modulator; and a second prism in the illumination and the projection paths for separating the second beam directed to the second modulator and the modulated second beam from the second modulator.

Another embodiment positions the first and second modulators such that pixelated images from the first and second modulators are offset by approximately one-half pixel at the image plane.

Another embodiment of the disclosed invention provides a method of producing a three dimensional image. The method comprising: providing a beam of light along an illumination path; sequentially color filtering the light beam; splitting the filtered light beam into a first beam having a first polarization state and a second beam having a second polarization state; modulating the first beam using a first spatial light modulator; modulating the second beam using a second spatial light modulator; and focusing the first and second modulated light beams on an image plane.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new three dimensional display system design and method has been developed that maximizes the efficiency of the system while limiting the number of modulators that are used to create the projected image.

While not necessary, the use of sequential color recapture, as described in U.S. patent application Ser. No. 09/705,467 greatly improves the brightness of the display system by maximizing the usable light from the light source. The following description assumes the use of the recycling integrator rod and sequential color recapture, but it should be understood that other embodiments do not utilize sequential color recapture and the recycling integrator rod.

Figure 1:
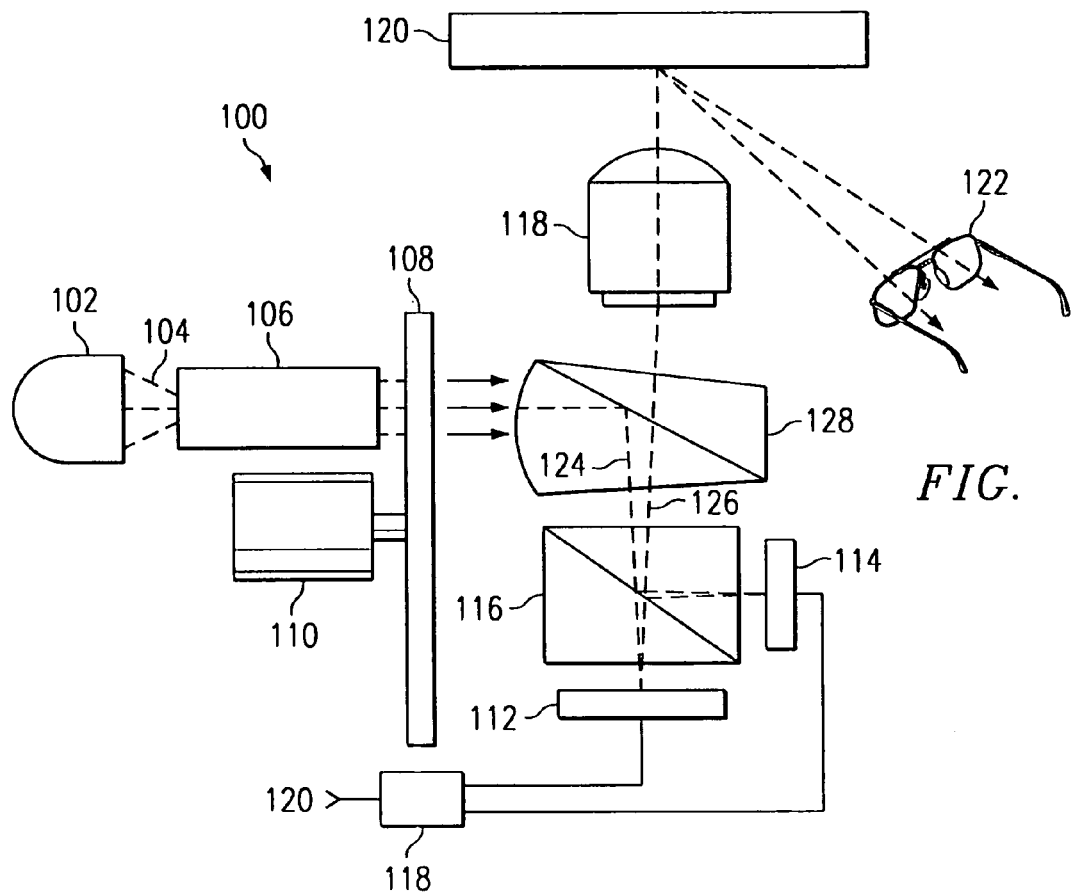
FIG. 1 is a schematic view of a one embodiment of a three dimensional display system using two spatial light modulators and a single projection path.

One embodiment of the three dimensional display system is shown in FIG. 1, which is a schematic view of a three dimensional display system 100 using two spatial light modulators and a single projection path. In FIG. 1, light source 102 emits a white light beam 104 which is focused onto a clear aperture of a recycling integrator 106. The light beam travels through the recycling integrator 106 and is reflected several times by the walls of the integrator 106. The multiple reflections homogenize the light beam giving it a uniform intensity across the width of the beam.

After leaving the exit end of the integrator, the homogenized light beam strikes a sequential color filter 108. The sequential color filter creates a filtered light beam. The filtered light beam comprises at least three spatially separated light beams. Each of the spatially separated light beams is comprised of a band of wavelengths giving the sub-beam a color. Typically three sub-beams are formed: a red, green, and blue sub-beam. Some embodiments include a fourth sub-beam comprised of white light.

A motor 110 spins the sequential color filter 108. The spinning makes the sub-beams move across the width of the combined beams. The portion of the sequential color filter 108 in the light path is imaged on the spatial light modulators 112, 114 such that each color sub-beam illuminates and is modulated by a subset of the modulator elements of the spatial light modulator. This sub-set changes as the sequential color filter rotates moving the sub-beams across the face of the modulator.

The filtered light beam, containing the colored filtered sub-beams, is separated by a polarizing beam splitter 116. The polarizing beam splitter 116 separates the light beam into two separate light beams, each comprising a portion of each color sub-beam created by the sequential color filter. A first portion of the light beam having a first polarization state is passed to a first spatial light modulator 112. A second portion of the light beam having a second polarization state is reflected to a second spatial light modulator 114.

The two modulators 112, 114 receive pixel data from a controller 118 and use the pixel data to modulate the light incident each of the modulators. The pixel data is derived from image data 120 representing the desired image and received by the controller 118. The first and second modulated light beams pass back through the polarizing beam splitter 116 and are combined into a single modulated light beam.

A projection lens 118 receives the modulated light beam and focuses the modulated light beam on an image plane 120. A viewer uses polarizing eyewear 122 to view the projected image. The polarizing eyewear 122 allows light of one polarization to pass through to the viewer's left eye, and light of the other polarization to pass through to the viewer's right eye. By providing proper pixel data to the modulators 112, 114, the perception of a three dimensional image is created.

The images produced by each of the spatial light modulators are focused on the image plane 120. Typically the images are converged such that the image created by a pixel of the first modulator overlies the image created by the same pixel of the second modulator. The pixel data provided to each of the pixels typically is offset to create the perception of the three dimensional image.

Alternatively, the images created by the two modulators are offset on the image plane. Offsetting the two images, typically by one-half of the spacing between the two pixels or less, may reduce the viewer's perception of the pixelization and create the perception of a higher resolution image. Additionally, when the images created by the two modulators is offset by one-half of the pixel pitch, an image with twice the resolution can be created for a viewer that does not wear the polarizing eyewear 122. Thus, a display with offset images can produce both three dimensional images and very high resolution two dimensional images. The offset may be in either the horizontal or vertical direction, or both.

Reflective spatial light modulators 112, 114 typically use an illumination beam 124 that strikes the modulator at an angle that is very close to normal to the surface of the modulator. The modulated light beam 126 leaves the modulator at an angle that is normal to the surface of the modulator or very close to the normal angle. Thus, there is very little separation between the incident illumination beam 124 and the reflected modulated beam 126 bearing the image. The lack of separation makes it difficult to place the projection lens 118 and the sequential color filter 108 in the projection and illumination light paths without interfering with each other.

One method of spatially separating the incident and reflected light beams is to use a prism. The prism separates the illumination and projection light beams by providing an interface that will cause one of the beams to reflect at the interface while allowing the other light beam to pass through the interface. FIG. 1 includes a TIR prism 128 assembly comprised of two prisms which reflect the illumination beam 124 at the interface between the two prisms while allowing the projection light beam 126 to pass through the light beams.

Figure 2:
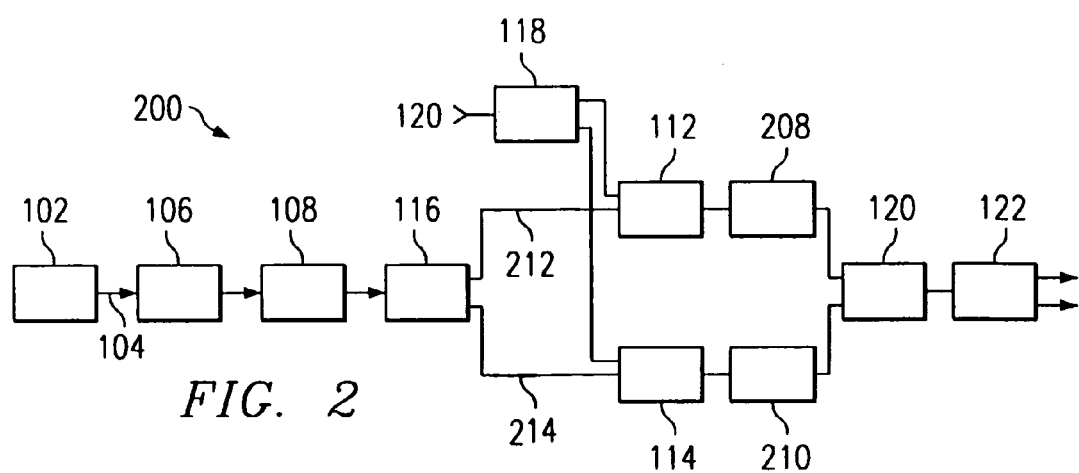
FIG. 2 is a schematic view of one embodiment of a three dimensional display system using two spatial light modulators and two projection paths.

A second embodiment of a three dimensional display system is shown in FIG. 2, which is a schematic view of a three dimensional display system 200 using two spatial light modulators and a single projection path. In FIG. 2, light source 102 emits a white light beam 104 which is focused onto a clear aperture of a recycling integrator 106. The light beam travels through the recycling integrator 106 and is reflected several times by the walls of the integrator 106. The multiple reflections homogenize the light beam giving it a uniform intensity across the width of the beam.

After leaving the exit end of the integrator, the homogenized light beam strikes a sequential color filter 108. The sequential color filter creates a filtered light beam. The filtered light beam comprises at least three spatially separated light beams. Each of the spatially separated light beams is comprised of a band of wavelengths giving the sub-beam a color. Typically three sub-beams are formed: a red, green, and blue sub-beam. Some embodiments include a fourth sub-beam comprised of white light.

As in FIG. 1, a motor spins the sequential color filter 108 to make the sub-beams move across the width of the combined beams. The portion of the sequential color filter 108 in the light path is imaged on the spatial light modulators 112, 114 such that each color sub-beam illuminates and is modulated by a subset of the modulator elements of the spatial light modulator. This sub-set changes as the sequential color filter rotates moving the sub-beams across the face of the modulator.

The filtered light beam, containing the colored filtered sub-beams, is separated by a polarizing beam splitter 116. The polarizing beam splitter 116 separates the light beam into two separate light beams, each comprising a portion of each color sub-beam created by the sequential color filter. A first portion of the light beam 212 has a first polarization state and is passed to a first spatial light modulator 112. A second portion of the light beam 214 has a second polarization state and is reflected to a second spatial light modulator 114.

The two modulators 112, 114 receive pixel data from a controller 118 and use the pixel data to modulate the light incident each of the modulators. The pixel data is derived from image data 120 representing the desired image and received by the controller 118.

A projection lens 208 receives the modulated light beam from a first modulator 112 and focuses the modulated light beam onto the image plane 120. A separate projection lens 210 receives the modulated light beam from a second modulator 114 and also focuses the modulated light beam onto the image plane 120. Polarizing eyewear 122 separates the light from the image plane allowing the viewer to discern a 3D projected image. The polarizing eyewear 122 allows light of one polarization to pass through to the viewer's left eye, and light of the other polarization to pass through to the viewer's right eye. By providing proper pixel data to the modulators 112, 114, the perception of a three dimensional image is created.

It is difficult to align the various spatial light modulators such that the images produced by each of the spatial light modulators is properly converged. One of the potential advantages of the disclosed system is that only two modulators typically are used rather than the three or more used by other designs. Without the use of the scrolling color recycling integrator, the creation of a color image would require either a color splitting prism and three modulators, or the use of the color wheel and the sequential creation of single-color images. The three modulators are difficult to converge and focus—given that two sets of three modulators would be necessary for a parallel color three dimensional display. Single modulator sequential color systems waste too much of the available light—since light of only one color is used at any given time—producing a dim image for a given lamp size.

Figure 3:
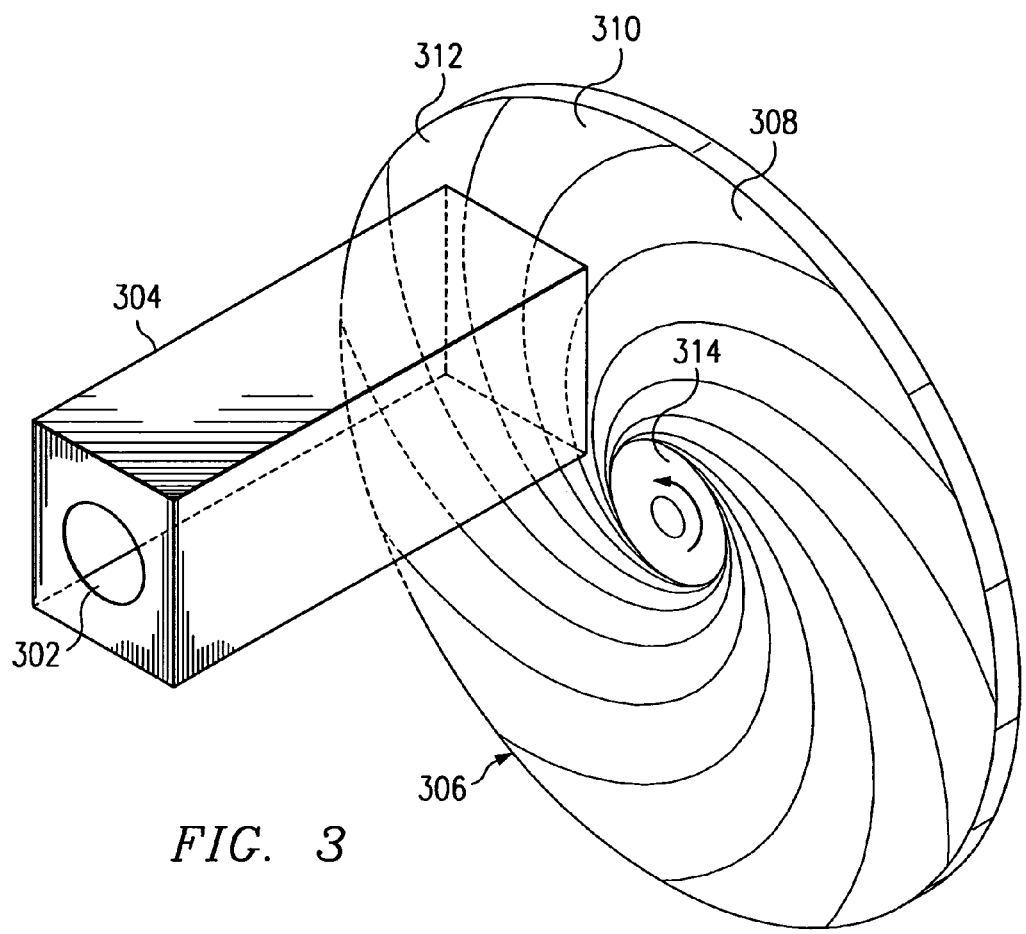
FIG. 3 is a perspective view of a recycling integrator and a spiral color wheel sequential color filter from FIGS. 1 and 2.

FIG. 3 is a perspective view of a recycling integrator and a spiral color wheel sequential color filter from FIGS. 1 and 2. In FIG. 3, light enters an input aperture 302 of the integrating rod 304. The light travels the length of the integrating rod 304, reflecting from the sides of the integrating rod 304 as it travels along, until exiting from the opposite end of the integrating rod and striking a sequential color filter 306. The sequential color filter 306 shown in FIG. 3 is a spiral color wheel. The spiral color wheel 306 shown in FIG. 3 has color filter segments of three different colors. The three color filters include a first primary color filter 308, a second primary color filter 310, and a third primary color filter 312. The interfaces between these segments typically follow a spiral of Archimedes such that as the color wheel spins about its hub 314 the images of the interfaces projected on the device move in a somewhat linear fashion.

Figure 4:
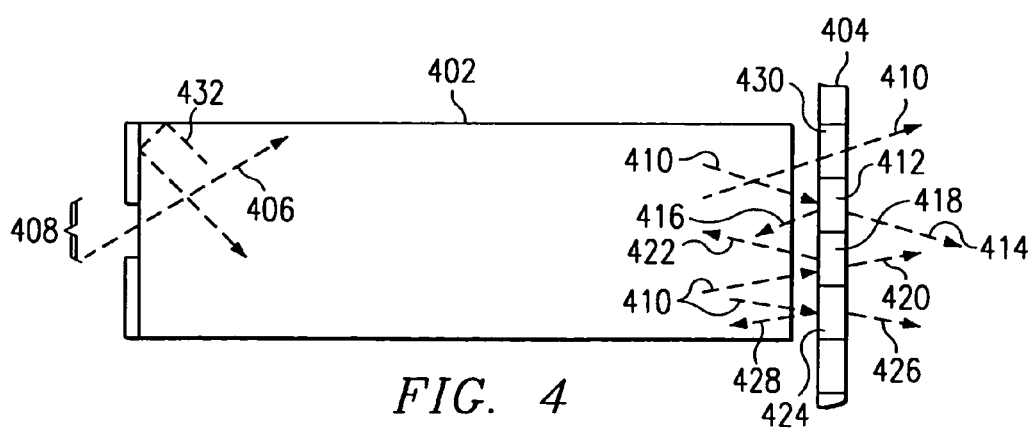
FIG. 4 is a cross section side view of recycling integrator rod and sequential color filter of FIG. 3 showing the light recycling function of the integrating rod.

The three filter colors are all represented at the exit end of the integrating rod at all times so that light exiting the integrating rod includes sub-beams of each of the three primary colors. FIG. 4 is a cross section side view of the integrating rod 402 and the sequential color filter 404 showing the recycling function of the integrating rod 402. In FIG. 4, white light 406 enters the integrating rod 402 through an aperture 408 at the input end of the rod and travels through the integrating rod 402, reflected by the sides of the rod as it travels along.

The integrating rod 402 may be a solid rod made from a material that is transparent over the wavelengths of interest-for example, glass or acrylic. Alternatively, the integrating rod 402 may be a hollow structure. When the light strikes the sides of the integrating rod, it is reflected, either by a mirrored surface or by total internal reflection.

Upon exiting the exit end of the integrating rod 402, the light may strike any one of the filter elements positioned at the end of the integrating rod 402. The color filter 404 of FIG. 4 includes four segments, one for each of the three primary colors: red, green, and blue, and one clear segment, often called a white segment, designed to pass all incident light.

White light 410 striking a red filter segment 412 is separated into a red light beam 414 which passes through the color filter and a cyan light beam 416 which is reflected. White light 410 striking a green filter segment 418 is separated into a green light beam 420 which passes through the color filter and a magenta light beam 422 which is reflected. White light 410 striking a blue filter segment 424 is separated into a blue light beam 426 which passes through the color filter and a yellow light beam 428 which is reflected. White light 410 striking the clear filter segment 430 passes through the filter segment.

Light rejected by the sequential color filter 404 in FIG. 4 retraces its path through the integrator rod 402 to the entrance face of the rod. Most of the light 432 returning to the entrance face of the integrating rod is reflected by the reflective aperture—the reflective area around the input aperture—and returns to the exit face of the integrating rod 402. Ideally, the light returned to the exit face of the integrating rod strikes a different color filter allowing an additional component of the white light to exit the rod 402.

The use of the recycling integrating rod 402 of FIG. 4 greatly improves the efficiency of a single modulator in a sequential color display system. As mentioned above, without the light recycling function, a given light source would produce a much dimmer projected image, or would require additional modulators to produce a bright image. The additional modulators would required complex alignment and would drive up the cost of the display system.

Thus, although there has been disclosed to this point a particular embodiment for three dimensional projection system and method therefore, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims. In the following claims, only elements denoted by the words "means for" are intended to be interpreted as means plus function claims under 35 U.S.C. § 112, paragraph six.

What is claimed is:

1. An image display system comprising:
   a light source for providing a beam of light along an illumination path;
   a recycling integrator having a mirrored input aperture on said illumination path for homogenizing said light beam;
   a sequential color filter on said illumination path for filtering said homogenized beam of light;
   a polarizing beam splitter on said illumination path for receiving said filtered beam of light at a first face, separating said filtered light beam into a first beam having a first polarization state and a second beam having a second polarization state;
   a first spatial light modulator proximate a second face of said polarizing beam splitter receiving and selectively modulating said first beam;

a second spatial light modulator proximate a third face of said polarizing beam splitter receiving and selectively modulating said second beam;

a total internal reflection prism assembly proximate said first face and on said illumination path and a projection path to separate the illumination and projection paths; and at least one projection lens on said projection path for focusing said first and second beams on an image plane.

2. The image display system of claim 1 said polarizing beam splitter combining said modulated first and second light beams.

3. The image display system of claim 1 said sequential color filter comprising a color wheel.

4. The image display system of claim 1 said sequential color filter comprising a spiral color wheel.

5. The image display system of claim 1 said total internal reflection prism assembly comprising:

at least one prism in said illumination and said projection paths for separating said filtered illumination light beam and said modulated light beam.

6. The image display system of claim 1 said total internal reflection prism assembly comprising:

a first prism in said illumination and said projection paths for separating said first beam directed to said first modulator and said modulated first beam from said first modulator; and a second prism in said illumination and said projection paths for separating said second beam directed to said second modulator and said modulated second beam from said second modulator.

7. The image display system of claim 1 modulated light from said first modulator passing through a first projection lens and light from said second modulator passing through a second projection lens.

8. The image display system of claim 1 wherein said first and second modulators are positioned such that pixelated images from said first and second modulators are offset by approximately one-half pixel in a horizontal direction at said image plane.

9. The image display system of claim 1 wherein said first and second modulators are positioned such that pixelated images from said first and second modulators are offset by approximately one-half pixel in a vertical direction at said image plane.

10. The image display system of claim 1 wherein said first and second modulators are positioned such that pixelated images from said first and second modulators are offset by approximately one-half pixel in both a horizontal and a vertical direction at said image plane.

11. The image display system of claim 1 said first modulator comprising a micromirror device.

12. The image display system of claim 1 said first modulator comprising a liquid crystal device.

13. The image display system of claim 1, wherein said recycling integrator is a solid integrating rod.

14. The image display system of claim 1, wherein said recycling integrator is a hollow integrating rod.

15. The image display system of claim 1 comprising polarized eyewear for a viewer of said image display system.

16. A method of producing an image, said method comprising:

providing a beam of light along an illumination path;
homogenizing said light beam using a recycling integrator having a mirrored input aperture;
sequentially color filtering said homogenized beam of light;
splitting said filtered light beam into a first beam having a first polarization state and a second beam having a second polarization state;
modulating said first beam using a first spatial light modulator;
modulating said second beam using a second spatial light modulator;
separating said filtered light beam from said modulated first and second beams using a total internal reflection prism assembly; and
focusing said first and second modulated light beams on an image plane.

17. The method of claim 16, comprising:
combining said modulated first and second light beams.

18. The method of claim 16, said sequentially color filtering comprising sequentially filtering said beam of light using a color wheel.

19. The method of claim 16, said sequentially color filtering comprising sequentially filtering said beam of light using a spiral color wheel.

20. The method of claim 16, said focusing said first and second modulated light beams on an image plane comprising:

focusing said first modulated light beam on said image plane using a first lens; and
focusing said second modulated light beam on said image plane using a second lens.

21. The method of claim 16, said first and second modulators forming pixelated images on said image plane; comprising:

positioning said first and second modulators such that said pixelated images are offset by approximately one-half pixel at said image plane.

22. The method of claim 16, said first and second modulators forming pixelated images on said image plane; comprising:

positioning said first and second modulators such that said pixelated images are offset by approximately one-half pixel in a horizontal direction at said image plane.

23. The method of claim 16, said first and second modulators forming pixelated images on said image plane; comprising:

positioning said first and second modulators such that said pixelated images are offset by approximately one-half pixel in a vertical direction at said image plane.

24. The method of claim 16, said first and second modulators forming pixelated images on said image plane; comprising:

positioning said first and second modulators such that said pixelated images are offset by approximately one-half pixel in both a horizontal and a vertical direction at said image plane.

25. The method of claim 16, said modulating said first beam comprising:
modulating said first beam using a micromirror device.

26. The method of claim 16, said modulating said first beam comprising:
modulating said first beam using a liquid crystal device.

27. The method of claim 16, said homogenizing said light beam using a recycling integrator comprising:
homogenizing said light beam using a solid integrating rod.

28. The method of claim 16, said homogenizing said light beam using a recycling integrator comprising:
homogenizing said light beam using a hollow integrating rod.

* * * * *